Aug. 14, 1945.　　　　　E. LAXO　　　　　2,382,237
APPARATUS FOR TINNING MARGINS OF BLACK IRON CAN BODY BLANKS
Filed June 19, 1944　　　3 Sheets-Sheet 1
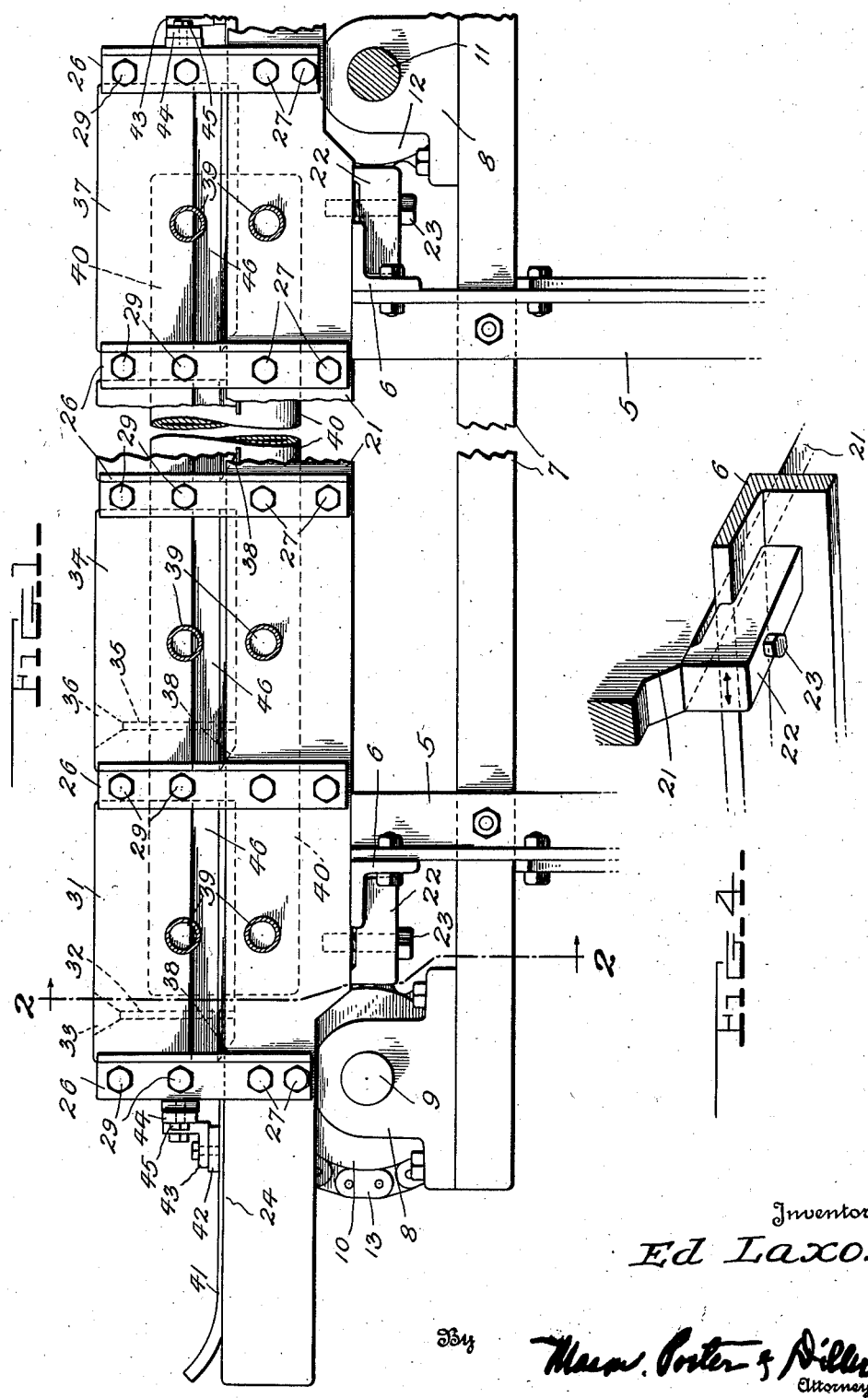
Inventor
Ed Laxo.

Aug. 14, 1945. E. LAXO 2,382,237
APPARATUS FOR TINNING MARGINS OF BLACK IRON CAN BODY BLANKS
Filed June 19, 1944 3 Sheets-Sheet 2
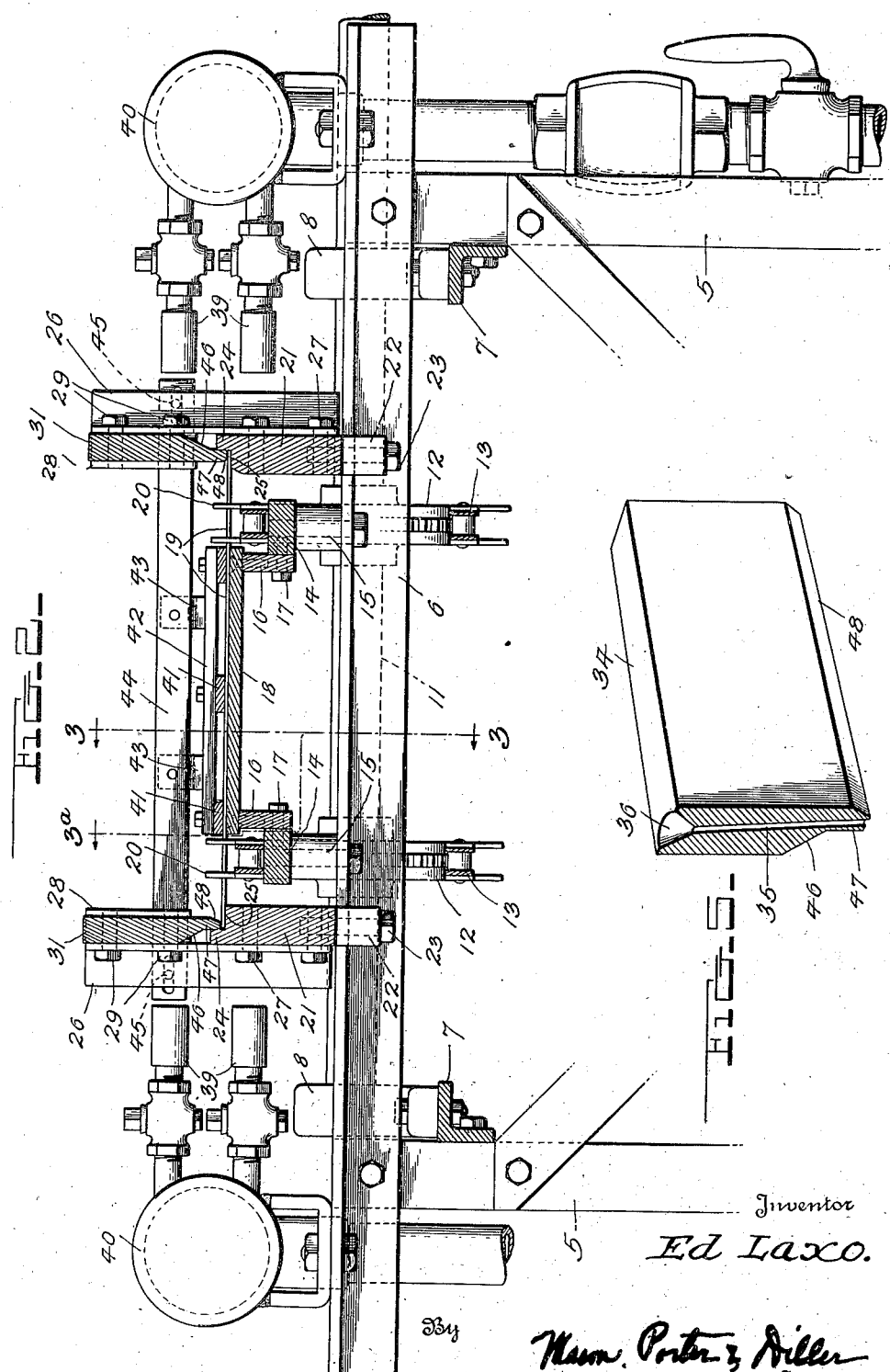
Inventor
Ed Laxo.
By
Mason, Porter & Diller
Attorneys

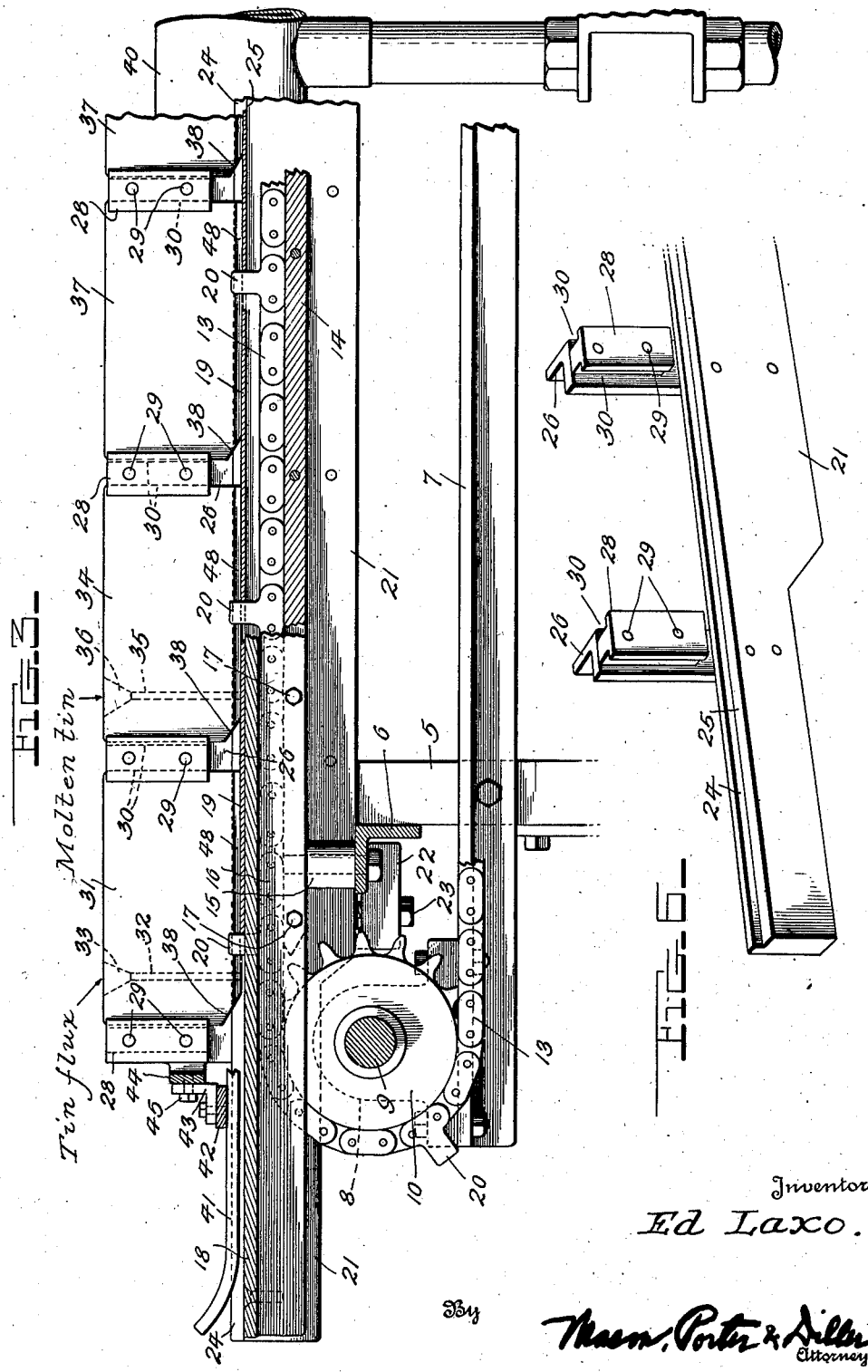

Patented Aug. 14, 1945

2,382,237

UNITED STATES PATENT OFFICE 2,382,237

APPARATUS FOR TINNING MARGINS OF BLACK IRON CAN BODY BLANKS

Ed Laxo, Riverside, Ill., assignor to Continental Can Company, Inc., New York, N. Y., a corporation of New York Application June 19, 1944, Serial No. 541,087

16 Claims. (Cl. 91—12.2)

The invention relates generally to the art of can making and primarily seeks to provide a novel apparatus for tinning the marginal edge portions of can body blanks subsequently to be brought together in the formation of side seam structures, thereby to facilitate solder bonding of the side seams.

In the manufacture of cans it is essential that the body blanks be tinned at least over the marginal portions which are to be brought together in the formation of side seams in order to assure the efficient solder bonding of the side seams, it being well known that the bonding solder will not efficiently adhere to the black iron bodies without special treatment. It is desirable also to prevent direct contact between foodstuffs and beverages packaged in cans from the black iron in the body structure. This has been accomplished by overall tinning of the body blanks from which the can bodies are formed, but obviously the use of more tin than is absolutely essential is to be avoided during the existing tin shortage. It has been found that satisfactory can bodies can be formed from blanks which are tinned at the marginal edges only, the remaining blank surfaces subsequently to be exposed to foodstuff or beverage contact being given a protective coating of enamel, lacquer or the like. Some materials not subject to contamination by direct contact with the black iron body metal can be packaged in cans made up from blanks that have been tinned only along the marginal edges intended to form the side seams, the remainder of the blanks being devoid of special protective coating. The present invention has to do with novel apparatus for applying tin only to the marginal edge portions of the can body blanks which are to be formed into side seams in the making up of the can bodies. The body blanks may or may not be given a protective coating other than the marginal tinning according to the particular use to which the cans to be made therefrom are to be put.

In its more detailed nature the invention resides in providing a can body blank edge tinning apparatus comprising a bed, means for feeding can body blanks in processional order over the bed with lateral marginal edge portions projecting beyond the bed, means for applying flux to the upper and lower marginal edge portions, and tin applicator bars between which the blank marginal edges are dragged effective to apply tin to said upper and lower marginal edge portions.

An object of the invention is to provide an apparatus of the character stated in which is included means for applying heat to the tin applicator bars.

Another object of the invention is to provide an apparatus of the character stated in which there are also included a plurality of presser or spreader bars engageable with the blanks after the tin has been applied thereon.

Another object of the invention is to provide an apparatus of the character stated in which the flux applicator means, the tin applicator means and the presser or spreader means engageable beneath the can body blank marginal edges comprises a single bar extending along each side of the apparatus, and the flux applicator means, the tin applicator means and the presser or spreader devices engageable above the can body blank marginal edges comprise individual bar sets floatably mounted, the flux applying bars and the tin applying bars each having a duct therethrough through which the flux or tin flows from a supply source into the spaces between the upper and lower applicator devices and means provided by the can body blank edge portions travelling between them.

Still another object of the invention is to provide an apparatus of the character stated in which the single bars common to all of the flux applying, the tin applying and the presser or spreader devices, and which are engageable beneath the can body blanks, are provided with upstanding flanges which form edge guides for the travelling can body blanks.

With the above and other objects in view that will hereinafter appear, the nature of the invention will be more clearly understood by reference to the following detailed description, the appended claims, and the several views illustrated in the accompanying drawings.

In the drawings:

Figure 1 is a side elevation illustrating an apparatus embodying the invention, parts being broken away and in section.

Figure 2 is a vertical cross section taken on the line 2—2 on Figure 1.

Figure 3 is a staggered vertical longitudinal sectional view, the section being taken on the lines 3A, 3—3 on Figure 2.

Figure 4 is a detail sectional perspective view illustrating one of the rocker clamps.

Figure 5 is a detail sectional perspective view of one of the floatably mounted applicator bars.

Figure 6 is a fragmentary perspective view illustrating one of the blank edge supporting and guiding bars and several of the uprights forming applicator bar receiving groove ways thereover.

In the apparatus herein disclosed as an example of embodiment of the invention, there is included a framing composed of uprights 5, transverse supporting angle members 6 secured to said uprights, and longitudinal supporting angle members 7 secured in parallel spaced relation to the uprights 5 in the manner clearly illustrated in Figures 1 and 2 of the drawings.

In bearings 8 mounted at one end of the apparatus on the longitudinal members 7, a cross shaft 9 is rotatably mounted, and the shaft 9 has a pair of sprockets 10 fixed thereon. In similar bearings 8 at the opposite end of the apparatus, a cross shaft 11 is rotatably mounted, and this shaft carries a pair of sprockets 12. The shaft 11 is adapted to be rotated by a hand crank or by any other suitable power applying means (not shown). A conveyor chain 13 passes over each longitudinally aligned pair of sprockets 10 and 12, and the upper flights of the chains 13 are supported on rails 14 which are in turn supported as at 15 on the transverse angle members 6. A longitudinal rail 16 is secured in upright relation, as at 17, at the inner edge of each rail 14, and the rails 16 serve to support a horizontal bed plate 18 over which the can body blanks 19 intended to have tin applied to the lateral marginal edge portions thereof are conveyed in processional order by lugs 20 projecting upwardly in equidistantly spaced relation from the chains 13 in the manner clearly illustrated in Figures 2 and 3 of the drawings.

Beside and outwardly of each chain 13 is mounted a support and applicator bar 21. Each of the bars 21 rests upon the upper surfaces of the transverse angle members 6 and is securely clamped thereon through the medium of rocker clamps 22 and securing screws 23 which pass upwardly through the clamps and into the bars in the manner clearly illustrated in Figures 1 and 4. Each bar 21 is provided with an upstanding blank edge guiding flange 24 and a horizontally disposed shelf or applicator surface 25. It will be observed that by reference to Figure 2 of the drawings that the lateral marginal edge portions of the can body blanks 19 extend over and rest upon the bar surfaces 25, and the extreme lateral edges of the blanks project into position for being accurately guided by the upstanding flanges 24 of said bars.

Uprights 26 are secured as at 27 in equidistantly spaced relation along the outer faces of the bars 21, and T-pieces 28 are secured as at 29 to the inner faces of the uprights 26 in the position clearly illustrated in Figures 2, 3 and 6 of the drawings and in a manner for providing vertical guideways 30. In the first laterally aligned set of guideways 30 are floatably mounted a pair of flux applicator bars 31, and each of the two bars of the pair is provided with a vertical duct 32 extending from a flux receiving funnel portion 33 in the upper extremity of the bar down through the bottom edge of the bar in the manner clearly illustrated in Figures 3 and 5 of the drawings. It is to be understood that a controlled supply of a suitable flux is deposited in the funnel portions 33 from a suitable source (not shown) and flows down through the ducts 32 into the spaces between the bottom surfaces of the bars 31 and the top surfaces or shelf portions 25 of the bars 21.

In the second laterally aligned set of guideways 30 are floatably mounted a pair of molten tin applicator bars 34, and each of the two bars of the pair is provided with a vertical duct 35 extending from a molten tin receiving funnel portion 36 at the upper extremity of the bar down through the bottom edge of the bar. It is to be understood that a controlled supply of molten tin is deposited in the funnel portions 36 from a suitable source (not shown) and flows down through the ducts 35 into the spaces between the bottom surfaces of the bars 34 and the top surfaces of shelf portions 25 of the bars 21. The remaining laterally aligned sets of grooves 30 serve to floatably mount presser or distributer bars 37, and since these bars serve merely to press upon and drag over the conveyed can body blank marginal edge portions so as to evenly distribute the applied tin thereover, they are not provided with supply ducts as are the bars 31 and 34. All of the bars 31, 34 and 37 are provided with bevelled lead end lower edge portions 38 so as to facilitate passage of the conveyed body blanks 19 thereunder.

All of the bars 21, 31, 34 and 37 are heated, preferably by gas flames directed thereon from burner nozzles 39 which project from the manifold 40 of a Bunsen burner equipment. See Figures 1, 2 and 3.

Upward buckling of the conveyed body blanks 19 is prevented by longitudinal holddown rails 41 which are secured to cross members 42 in the manner clearly illustrated in Figures 1 and 2. The cross members 42 are in turn secure to brackets 43 which are attached to cross bars 44, and the cross bars are in turn secured as at 45 to the end uprights 26.

The bars 31, 34 and 37 are reduced in thickness at their outer faces, as at 46, so as to provide flat face portions 47 disposed to lie against the inwardly directed faces of the guide flanges 24 of the bars 21. The lower portions of the inner faces of the bars 31, 34 and 37 are bevelled as at 48. It will be observed by reference to Figure 2 of the drawings that the bar 21 disposed at the right in said figure has the upper corner edge thereof bevelled so as to reduce the width of the shelf 25. Thus the shelf 25 at the right in Figure 2 is narrower than the shelf 25 at the left in said figure. It will also be observed that the undersurface of the bars 31, 34 and 37 at the left in Figure 2 are narrower than the like faces on the companion bars at the right side of said figure.

In the operation of the apparatus, the can body blanks being conveyed in processional order over the horizontal bed plate 18 by the conveyor chains 13 first pass under the laterally aligned set of applicator bars 31, and while passing under these bars the flux applied to the upper surface of the bar shelf portions 25 and to the undersurfaces of the applicator bars 31 by passage of the flux through the ducts 32 will be applied to the upper and lower surfaces of the blanks at the lateral marginal edge portions thereof. As the blanks pass under the applicator bars 34, the molten tin supplied to the upper bar surfaces 25 and to the undersurfaces of the bars 34 through the supply ducts 35 will be applied to the upper and lower marginal edge portions of the blanks treated by the flux as aforesaid, and while passing under the several sets of presser and distributer bars 37, the applied molten tin will be spread and evenly distributed over said upper and lower marginal edge portions of said blanks. The floatable mounting of the several bars 31, 34 and 37 serves to compensate for any unevenness or lack of uniformity in thickness of the can body blanks, and thus a smooth and even application and distribution of the tin is assured.

As is well known in the art, the marginal edge portions of can body blanks are formed into hooks which are interlocked and bumped in order to form the side seams which subsequently are solder bonded in the completion of the can body formation. Because of the relation of the hooks and the different widths of engaging portions thereof in the finished seam structures, it is desirable that tin stripes of varied widths be applied to the can body blanks so as to assure the desired efficient solder bonding of the side seams in the completion of the can bodies. The reason for this variation in width of the applied tin stripes, and the specific relation of said stripes is disclosed in detail in my copending application for U. S. Letters Patent Serial No. 541,088, filed June 19, 1944, and further detailed description of this arrangement of striping is thought to be unnecessary in this disclosure. It will be apparent however, by reference to Figure 2 of the drawings, that the undersurface of the floatably mounted applicator bar 34 at the left in Figure 2 will apply the narrowest tin stripe, the floatably mounted applicator bar 34 at the right in Figure 2 will apply a wider tin stripe, the underlying surface 25 of the applicator bar 21 at the right in Figure 2 will apply the widest tin stripe. The constant application of the heat to the several bars 31, 34 and 37 by flames from the burners 39 assures the smooth and even application and distribution of the tin to the upper and lower marginal edge portions of the body blanks.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, a can body blank supporting bed, means for conveying blanks over the bed in processional order with marginal edge portions thereof extended laterally beyond the supporting means, blank edge supporting and applicator bar means extending along at least one side of said bed in position for engaging under laterally extended edge portions of blanks conveyed thereover, bar means opposing said supporting and applicator bar means and disposed to engage in pressure contact over laterally extended edge portions of the blanks conveyed over said bed, and means for directing molten tin between said bar means to be applied thereby to the blank edge portions engaging in drag contact therewith.

2. In apparatus of the character described, a can body blank supporting bed, means for conveying blanks over the bed in processional order with marginal edge portions thereof extended laterally beyond the supporting means, lower blank edge supporting and applicator bar means extending along at least one side of said bed in position for engaging under laterally extended edge portions of blanks conveyed thereover, upper bar means opposing said supporting and applicator bar means, means floatably mounting said upper bar means in position for engaging in pressure contact over laterally extended edge portions of the blanks conveyed over said bed, and means for directing molten tin between said bar means to be applied thereby to the blank edge portions engaging in drag contact therewith.

3. In apparatus of the character described, a can body blank supporting bed, means for conveying blanks over the bed in processional order with marginal edge portions thereof extended laterally beyond the supporting means, blank edge supporting and applicator bar means extending along at least one side of said bed in position for engaging under laterally extended edge portions of blanks conveyed thereover, bar means opposing said supporting and applicator bar means and disposed to engage in pressure contact over laterally extended edge portions of the blanks conveyed over said bed, means for directing molten tin between said bar means to be applied thereby to the blank edge portions engaging in drag contact therewith, and means for applying heat to both said bar means.

4. In apparatus of the character described, a can body blank supporting bed, means for conveying blanks over the bed in processional order with marginal edge portions thereof extended laterally beyond the supporting means, blank edge supporting and applicator bar means extending along at least one side of said bed in position for engaging under laterally extended edge portions of blanks conveyed thereover, bar means opposing said supporting and applicator bar means and disposed to engage in pressure contact over laterally extended edge portions of the blanks conveyed over said bed, means for directing molten tin between said bar means to be applied thereby to the blank edge portions engaging in drag contact therewith, and flange means extending from one said bar means in overlapping relation to the other of said bar means to form edge guide means for the conveyed blanks.

5. In apparatus of the character described, a can body blank supporting bed, means for conveying blanks over the bed in processional order with marginal edge portions thereof extended laterally beyond the supporting means, blank edge supporting and applicator bar means extending along at least one side of said bed in position for engaging under laterally extended edge portions of blanks conveyed thereover, bar means opposing said supporting and applicator bar means and disposed to engage in pressure contact over laterally extended edge portions of the blanks conveyed over said bed, and means for directing molten tin between said bar means to be applied thereby to the blank edge portions engaging in drag contact therewith, said last named means including a flow duct extending through the body of the last mentioned bar means and opening through the surface of said body opposed to the blank engaging surface of the other bar means.

6. In apparatus of the character described, a can body blank supporting bed, means for conveying blanks over the bed in processional order with marginal edge portions thereof extended laterally beyond the supporting means, a lower blank edge supporting and applicator bar extending along one side of said bed in position for engaging under laterally extended edge portions of the blanks conveyed thereover, an upper flux applicator bar disposed over the lower bar in position for engaging in pressure contact over blank edge portions being conveyed over said lower bar, means for directing flux between the upper and lower bars to be applied to the blank edge portions engaging in drag contact therewith, an upper molten tin applicator bar disposed over the lower bar in position for engaging in pressure contact over previously fluxed blank edge portions being conveyed over said lower bar, and means for directing molten tin between the tin applicator bar and the underlying portion of the lower bar to be applied to the previously fluxed blank edge portions engaging in drag contact therewith.

7. In apparatus of the character described, a can body blank supporting bed, means for conveying blanks over the bed in processional order with marginal edge portions thereof extended laterally beyond the supporting means, a lower blank edge supporting and applicator bar extending along one side of said bed in position for engaging under laterally extended edge portions of the blanks conveyed thereover, an upper flux applicator bar disposed over the lower bar in position for engaging in pressure contact over blank edge portions being conveyed over said lower bar, means for directing flux between the upper and lower bars to be applied to the blank edge portions engaging in drag contact therewith, an upper molten tin applicator bar disposed over the lower bar in position for engaging in pressure contact over previously fluxed blank edge portions being conveyed over said lower bar, means for directing molten tin between the tin applicator bar and the underlying portion of the lower bar to be applied to the previously fluxed blank edge portions engaging in drag contact therewith, and at least one upper tin presser and spreader bar disposed over the lower bar in position for engaging in pressure contact with previously tinned laterally extended blank edge portions travelling over said lower bar.

8. In apparatus of the character described, a can body blank supporting bed, means for conveying blanks over the bed in processional order with marginal edge portions thereof extended laterally beyond the supporting means, a lower blank edge supporting and applicator bar extending along one side of said bed in position for engaging under laterally extended edge portions of the blanks conveyed thereover, an upper flux applicator bar disposed over the lower bar in position for engaging in pressure contact over blank edge portions being conveyed over said lower bar, means for directing flux between the upper and lower bars to be applied to the blank edge portions engaging in drag contact therewith, an upper molten tin applicator bar disposed over the lower bar in position for engaging in pressure contact over previously fluxed blank edge portions being conveyed over said lower bar, means for directing molten tin between the tin applicator bar and the underlying portion of the lower bar to be applied to the previously fluxed blank edge portions engaging in drag contact therewith, at least one upper tin presser and spreader bar disposed over the lower bar in position for engaging in pressure contact with previously tinned laterally extended blank edge portions travelling over said lower bar, and means floatably mounting all said upper bars.

9. In apparatus of the character described, a can body blank supporting bed, means for conveying blanks over the bed in processional order with marginal edge portions thereof extended laterally beyond the supporting means, a lower blank edge supporting and applicator bar extending along one side of said bed in position for engaging under laterally extended edge portions of the blanks conveyed thereover, an upper flux applicator bar disposed over the lower bar in position for engaging in pressure contact over blank edge portions being conveyed over said lower bar, means for directing flux between the upper and lower bars to be applied to the blank edge portions engaging in drag contact therewith, an upper molten tin applicator bar disposed over the lower bar in position for engaging in pressure contact over previously fluxed blank edge portions being conveyed over said lower bar, means for directing molten tin between the tin applicator bar and the underlying portion of the lower bar to be applied to the previously fluxed blank edge portions engaging in drag contact therewith, at least one upper tin presser and spreader bar disposed over the lower bar in position for engaging in pressure contact with previously tinned laterally extended blank edge portions travelling over said lower bar, and means floatably mounting all said upper bars, each said flux and molten tin directing means including a flow duct extending through the body of the respective upper bar and opening through the surface of said body opposed to the blank engaging surface of the lower bar.

10. In apparatus of the character described, a can body blank supporting bed, means for conveying blanks over the bed in processional order with marginal edge portions thereof extended laterally beyond the supporting means, a lower blank edge supporting and applicator bar extending along each side of said bed in position for engaging under the laterally extended edge portions of the blanks conveyed thereover, a laterally aligned set of upper flux applicator bars disposed over the lower bars in position for engaging in pressure contact over blank edge portions being conveyed over the lower bars, means for directing flux between the upper and lower bars to be applied to the blank edge portions engaging in drag contact therewith, a laterally aligned set of upper molten tin applicator bars disposed over the lower bars in position for engaging in pressure contact over previously fluxed blank edge portions being conveyed over said lower bars, and means for directing molten tin between the tin applicator bars and the underlying portions of the lower bars to be applied to the previously fluxed blank edge portions engaging in drag contact therewith.

11. In apparatus of the character described, a can body blank supporting bed, means for conveying blanks over the bed in processional order with marginal edge portions thereof extended laterally beyond the supporting means, a lower blank edge supporting and applicator bar extending along each side of said bed in position for engaging under the laterally extended edge portions of the blanks conveyed thereover, a laterally aligned set of upper flux applicator bars disposed over the lower bars in position for engaging in pressure contact over blank edge portions being conveyed over the lower bars, means for directing flux between the upper and lower bars to be applied to the blank edge portions engaging in drag contact therewith, a laterally aligned set of upper molten tin applicator bars disposed over the lower bars in position for engaging in pressure contact over previously fluxed blank edge portions being conveyed over said lower bars, and means for directing molten tin between the tin applicator bars and the underlying portions of the lower bars to be applied to the previously fluxed blank edge portions engaging in drag contact therewith, each said lower bar having an upstanding flange forming edge guide means engageable by the lateral edges of the conveyed blanks.

12. In apparatus of the character described, a can body blank supporting bed, means for conveying blanks over the bed in processional order with marginal edge portions thereof extended laterally beyond the supporting means, a lower blank edge supporting and applicator bar extending along each side of said bed in position for engaging under the laterally extended edge portions of the blanks conveyed thereover, a laterally aligned set of upper flux applicator bars disposed over the lower bars in position for engaging in pressure contact over blank edge portions being conveyed over the lower bars, means for directing flux between the upper and lower bars to be applied to the blank edge portions engaging in drag contact therewith, a laterally aligned set of upper molten tin applicator bars disposed over the lower bars in position for engaging in pressure contact over previously fluxed blank edge portions being conveyed over said lower bars, means for directing molten tin between the tin applicator bars and the underlying portions of the lower bars to be applied to the previously fluxed blank edge portions engaging in drag contact therewith, and means floatably mounting all said upper bars.

13. In apparatus of the character described, a can body blank supporting bed, means for conveying blanks over the bed in processional order with marginal edge portions thereof extended laterally beyond the supporting means, a lower blank edge supporting and applicator bar extending along each side of said bed in position for engaging under the laterally extended edge portions of the blanks conveyed thereover, a laterally aligned set of upper flux applicator bars disposed over the lower bars in position for engaging in pressure contact over blank edge portions being conveyed over the lower bars, means for directing flux between the upper and lower bars to be applied to the blank edge portions engaging in drag contact therewith, a laterally aligned set of upper molten tin applicator bars disposed over the lower bars in position for engaging in pressure contact over previously fluxed blank edge portions being conveyed over said lower bars, means for directing molten tin between the tin applicator bars and the underlying portions of the lower bars to be applied to the previously fluxed blank edge portions engaging in drag contact therewith, and at least one laterally aligned set of upper tin presser and spreader bars disposed over the lower bars in position for engaging in pressure contact with previously tinned laterally extended blank edge portions travelling over said lower bars.

14. In apparatus of the character described, a can body blank supporting bed, means for conveying blanks over the bed in processional order with marginal edge portions thereof extended laterally beyond the supporting means, a lower blank edge supporting and applicator bar extending along each side of said bed in position for engaging under the laterally extended edge portions of the blanks conveyed thereover, a laterally aligned set of upper flux applicator bars disposed over the lower bars in position for engaging in pressure contact over blank edge portions being conveyed over the lower bars, means for directing flux between the upper and lower bars to be applied to the blank edge portions engaging in drag contact therewith, a laterally aligned set of upper molten tin applicator bars disposed over the lower bars in position for engaging in pressure contact over previously fluxed blank edge portions being conveyed over said lower bars, means for directing molten tin between the tin applicator bars and the underlying portions of the lower bars to be applied to the previously fluxed blank edge portions engaging in drag contact therewith, and means floatably mounting all said upper bars, said flux and molten tin directing means including a flow duct extending through the body of each of the upper flux and molten tin applicator bars and opening through the surface of the respective body opposed to the blank engaging surface of the underlying bar.

15. In apparatus of the character described, a can body blank supporting bed, means for conveying blanks over the bed in processional order with marginal edge portions thereof extended laterally beyond the supporting means, a lower blank edge supporting and applicator bar extending along each side of said bed in position for engaging under the laterally extended edge portions of the blanks conveyed thereover, a laterally aligned set of upper flux applicator bars disposed over the lower bars in position for engaging in pressure contact over blank edge portions being conveyed over the lower bars, means for directing flux between the upper and lower bars to be applied to the blank edge portions engaging in drag contact therewith, a laterally aligned set of upper molten tin applicator bars disposed over the lower bars in position for engaging in pressure contact over previously fluxed blank edge portions being conveyed over said lower bars, means for directing molten tin between the tin applicator bars and the underlying portions of the lower bars to be applied to the previously fluxed blank edge portions engaging in drag contact therewith, means floatably mounting all said upper bars, and means for applying heat to all said bars.

16. In apparatus of the character described, a can body blank supporting bed comprising a flat table having a depressed rail extending along each lateral edge thereof, means for conveying blanks over the bed in processional order with marginal edge portions thereof extended laterally beyond the supporting means and including conveyor chain flights movable over said rails, hold down means disposed longitudinally over the bed and effective to prevent upward buckling of blanks being conveyed over the bed, a lower blank edge supporting and applicator bar extending along each side of said bed in position for engaging under the laterally extended edge portions of the blanks conveyed thereover, a laterally aligned set of upper flux applicator bars disposed over the lower bars in position for engaging in pressure contact over blank edge portions being conveyed over the lower bars, means for directing flux between the upper and lower bars to be applied to the blank edge portions engaging in drag contact therewith, a laterally aligned set of upper molten tin applicator bars disposed over the lower bars in position for engaging in pressure contact over previously fluxed blank edge portions being conveyed over said lower bars, and means for directing molten tin between the tin applicator bars and the underlying portions of the lower bars to be applied to the previously fluxed blank edge portions engaging in drag contact therewith.

ED LAXO.